No. 746,443. PATENTED DEC. 8, 1903.
C. B. BISHOP.
SPECTACLES OR EYEGLASSES.
APPLICATION FILED SEPT. 29, 1900.
NO MODEL.
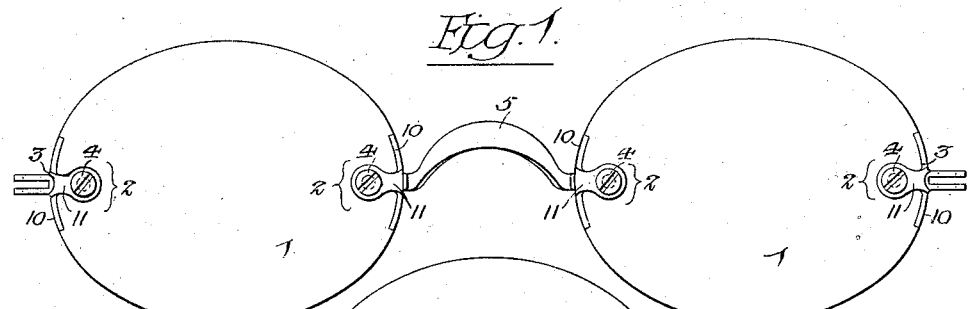
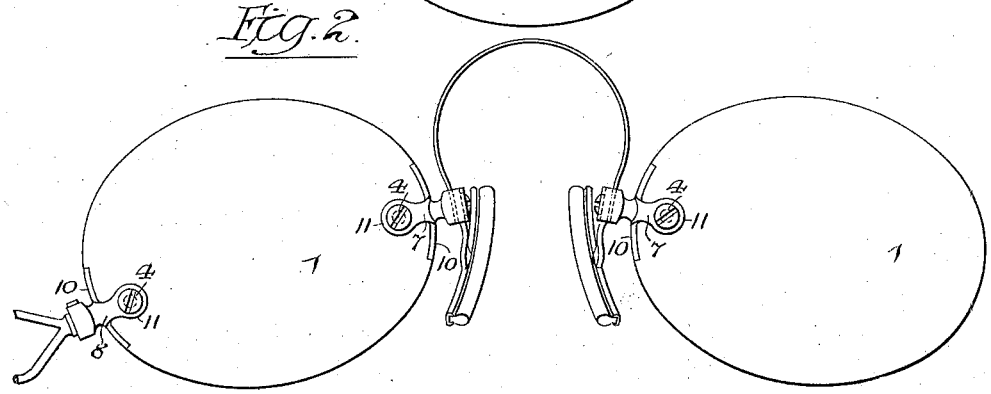
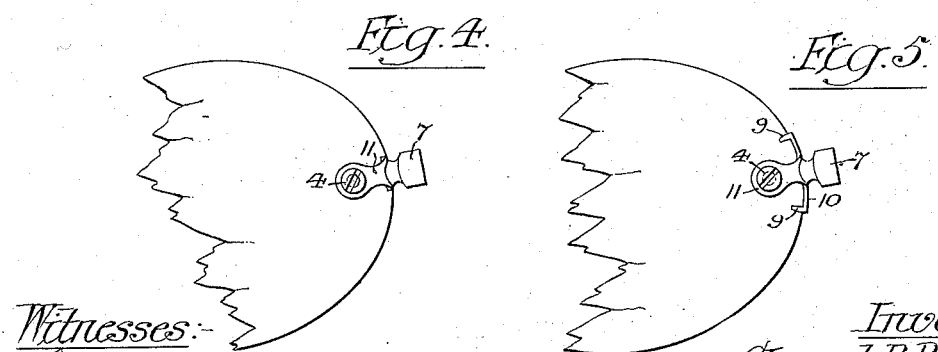
Witnesses:
Louis M. T. Whitehead.
Hamilton D. Turner.
Inventor
Clement B. Bishop.
by his Attorneys:
Howson & Howson No. 746,443.

Patented December 8, 1903.

UNITED STATES PATENT OFFICE.

CLEMENT B. BISHOP, OF PHILADELPHIA, PENNSYLVANIA.

SPECTACLES OR EYEGLASSES.

SPECIFICATION forming part of Letters Patent No. 746,443, dated December 8, 1903.

Application filed September 29, 1900. Serial No. 31,540. (No model.)

*To all whom it may concern:*

Be it known that I, CLEMENT B. BISHOP, a citizen of the United States, residing in Philadelphia, Pennsylvania, have invented certain Improvements in Spectacles or Eyeglasses, of which the following is a specification.

One object of my invention is to so construct the lenses of spectacles and eyeglasses and the mountings for such lenses as to prevent the lenses from working loose from said mountings.

A further object is to improve the appearance of spectacles and eyeglasses by the use of neater and more snugly-fitting mountings than are usually employed.

These objects I attain in the manner hereinafter set forth, reference being had to the accompanying drawings, in which—

Figure 1 is a front view of a pair of spectacles constructed in accordance with my invention. Fig. 2 is a similar view of a pair of eyeglasses embodying the invention. Fig. 3 is a view of one of the lenses shown in Fig. 1, and Figs. 4 and 5 are views illustrating modifications of my invention.

In Fig. 1 I have represented a pair of spectacles in which 1 are the lenses, 2 the nosepiece mountings, and 3 the temple-mountings, each of said mountings consisting of a bar, strap, or arm 10 for bearing upon the edge of the lens and side clips 11 embracing the lens and connected by a screw or bolt 4, which passes through an opening in the lens adjacent to the edge of the same, the nose-piece mountings being secured directly to the nosepiece 5 and the temple-mountings having projecting jaws for the reception of the templeeyes. These mountings are of the character commonly in use; but the lenses 1 differ from ordinary lenses in that each of them is recessed at the ends, as shown at 12 in Fig. 3, for the reception of the end bars 10 of the mountings, the recesses terminating in abrupt shoulders 6, against which the ends of said end bars of the mountings bear, so that each mounting is snugly confined to the lens, and the latter is prevented from working loose, thereby overcoming a serious objection to ordinary spectacles and eyeglasses in which the end bar of the mounting simply bears upon the rounded end of the lens.

In adapting my invention to eyeglasses both the spring-mounting 7 and handle-mounting 8 are by preference let into recesses in the edge of the lens, as shown in Fig. 2. Besides preventing the lenses from working loose in the mounting the recessing of the lenses provides for a close and snug fit of the mountings to the lenses and enables the end bars 10 of the mountings to be let into the lens, so that their outer edges will be flush with the contour of the lens, thereby improving the latter as regards neatness of finish.

As the purpose of the projecting end bar 10 in an ordinary lens-mounting is largely to prevent the lens from working loose, and as this function is in my improved lens performed by the recessing of said lens, the projecting end bar 10 of the mounting may, if desired, be dispensed with and the width of the recess in the lens correspondingly decreased— as shown, for instance, in Fig. 4—or the lens may have at each end a pair of contracted slots or recesses so spaced as to receive inwardly-bent end portions 9 of the end bar, strap, or arm 10 of the mounting, as shown, for instance, in Fig. 5.

I am aware that lenses for spectacles and eyeglasses have been provided at the ends with transverse recesses for the reception of lugs or projections on the mountings, which lugs or projections were held in engagement with the recesses by reason of the elasticity of the mountings; but an important feature of my invention is the rigid confinement of the mounting to the lens, whereby the projection which engages with the recess of the lens cannot escape therefrom by reason of the yielding of any part of the mounting.

Having thus described my invention, I claim and desire to secure by Letters Patent—

1. The herein-described improvement in spectacles and eyeglasses consisting of the combination with the lenses having transverse recesses therein extending from side to side at the edges of said lenses, and openings some distance inwardly from the recessed edges of the lenses, of mountings engaging at their ends with the shoulders formed by the said transverse recesses in the lenses, said mountings having inwardly-projecting ears overlapping the lenses and fitting snugly thereto, said ears being rigidly connected to the lenses by bolts passing through the openings in the latter, substantially as specified.

2. A mount for eyeglasses or spectacles comprising perforated clips which overlie the sides of the lens, an arm having an inward-bent end for engagement with one of the walls of a slot formed in the lens, the arm between the clips and the inturned end overlying and engaging the edge of the lens when the mount is attached thereto.

3. In a frameless spectacle or eyeglass, a lens having a relatively long, shallow concentric recess in its edge, the end walls of which are substantially parallel and extend across its edge at right angles to its plane and form transverse abrupt shoulders, in combination with a mounting comprising a stud having a curved strap fitted in and countersunk in said recess, coextensive in width therewith, from end to end, and having squared ends bearing against the ends of the recess, and ears projecting from the central portion of the strap and bearing on opposite sides of the lens, and a screw extending through lined openings in the lens and ears, the contacting parallel ends of the notch and strap preventing pivotal movement of the lens in the mounting and also preventing angular play of the lens between the ears, at right angles to the axis of the screw, substantially as described.

4. The combination with a lens having near its perimeter a perforation and in the perimeter to one side of the longitudinal axis of the lens and at a distance from the perforation a recess, of a lens-mount having perforated clips to overlie the perforation and receive connecting means which engages the clips and passes through the perforation in the lens, the mount having to one side of the clips a part which overlies and engages the edge of the lens between the perforation and the recess, the end of the overlying part being bent inward to lie within the recess, for the purpose set forth.

5. A mount for the lens of eyeglasses having side-embracing clips connected to the lens and a member which extends in line with the part of the mount between the clips, such member overlying a part of the edge of the lens and being provided with a bent end which engages a wall of the recess in the lens at a point distant from where the clips are connected thereto, substantially as and for the purpose set forth.

6. A lens having near its perimeter a perforation and to one side of the longitudinal axis of the lens an open-ended slot in combination with a lens-mount having apertured clips and a part which overlies the edge of the lens between the clips and the slot, the end of such part having an inward-bent end to engage the walls of the slot, and means for connecting the clips, which means is passed through the perforation in the lens.

In testimony whereof I have signed my name to this specification in the presence of two subscribing witnesses.

CLEMENT B. BISHOP.

Witnesses:
WILL. A. BARR,
JOS. H. KLEIN.